United States Patent
Ito

(10) Patent No.: US 7,315,323 B2
(45) Date of Patent: Jan. 1, 2008

(54) DIGITAL CAMERA USING AN INDICATING DEVICE TO INDICATE A PLURALITY OF FUNCTIONS

(75) Inventor: Takeyoshi Ito, Asaka (JP)

(73) Assignee: Fujifilm Corporation, Tokyo (JP)

( * ) Notice: Subject to any disclaimer, the term of this patent is extended or adjusted under 35 U.S.C. 154(b) by 468 days.

(21) Appl. No.: 10/047,022

(22) Filed: Jan. 17, 2002

(65) Prior Publication Data

US 2002/0097323 A1 Jul. 25, 2002

(30) Foreign Application Priority Data

Jan. 19, 2001 (JP) ............................ 2001-012197

(51) Int. Cl.
- *H04N 5/225* (2006.01)
- *H04N 5/222* (2006.01)
- *G03B 7/26* (2006.01)
- *G03B 7/02* (2006.01)
- *G03B 17/18* (2006.01)

(52) U.S. Cl. ............................. 348/207.1; 348/207.2; 348/333.02; 396/279; 396/281; 396/286

(58) Field of Classification Search ............ 348/207.1, 348/207.99, 372–373, 375–376, 207.2, 207.11, 348/333.02, 333.04; 396/88, 279, 281, 286; 386/106; 455/573

See application file for complete search history.

(56) References Cited

U.S. PATENT DOCUMENTS

| | | | |
|---|---|---|---|
| 5,214,516 A | * | 5/1993 | Okino et al. ............... 386/106 |
| 5,784,105 A | * | 7/1998 | Kawamura ................. 348/372 |
| 6,526,293 B1 | * | 2/2003 | Matsuo ....................... 455/573 |
| 6,704,506 B2 | * | 3/2004 | Sasagawa .................... 396/88 |
| 6,721,001 B1 | * | 4/2004 | Berstis ..................... 348/231.3 |
| 2003/0011702 A1 | * | 1/2003 | Ohmura et al. ............ 348/372 |
| 2003/0169349 A1 | * | 9/2003 | Aoi et al. ................ 348/231.2 |

FOREIGN PATENT DOCUMENTS

| | | |
|---|---|---|
| JP | 02-007030 | 1/1990 |
| JP | 02-044327 | 2/1990 |
| JP | 06-351012 | 12/1994 |
| JP | 10-322652 | 12/1998 |
| JP | 11-261937 | 9/1999 |

* cited by examiner

*Primary Examiner*—Lin Ye
*Assistant Examiner*—Kelly Jerabek
(74) *Attorney, Agent, or Firm*—Birch, Stewart, Kolasch & Birch, LLP

(57) ABSTRACT

Operation situations of a plurality of functions of the camera can be checked from a front of the camera without adding any new hardware. A self-timer LED which is previously provided on a front of the camera is also used as an indicating device which indicates operation situations of other functions of the camera. That is, operation situations such as charging a rechargeable battery or communicating with a personal computer are indicated by lighting, blinking, or the like of the self-timer LED. Especially, when a digital camera is mounted to a cradle used in charging the battery or communicating with the personal computer, the operation situations such as charging or communicating can be effectively checked from the front of the camera. Further, for a digital camera which has a moving image-capturing function or a voice recording function, moving image recording or voice recording is indicated by lighting, blinking, or the like of the self-timer LED.

5 Claims, 11 Drawing Sheets

DIGITAL CAMERA USING AN INDICATING DEVICE TO INDICATE A PLURALITY OF FUNCTIONS

BACKGROUND OF THE INVENTION

1. Field of the Invention

The present invention relates to a digital camera, and more particularly to a digital camera having a self-timer image-capturing function.

2. Description of the Related Art

Generally, a digital camera having a self-timer image-capturing function is provided with a self-timer light emitting diode (LED) on a front of the camera, and notifies a captured person of a situation in self-timer image-capturing by lighting or blinking of the self-timer LED.

In the vicinity of a viewfinder of the camera, there are provided finder LEDs for two colors (e.g., red and green). Emitting a green light of the finder LED shows power on and image-capturing standby, emitting an orange light (simultaneous emitting of red and green lights) shows electric flash charging, and emitting a red light shows attention/warning.

An indicating device of the digital camera, typically such as the finder LED or a liquid crystal monitor which displays images, is provided on a rear or a top of the camera so as to be checked in operating the camera; however, on the front of the camera, only the self-timer LED is provided.

With recent increased functions of the digital camera, it is sometimes convenient that operation situations of functions of the camera can be checked from the front of the camera, which causes a problem of an increase in cost due to addition of the indicating device.

SUMMARY OF THE INVENTION

The present invention has been achieved in view of the above-described circumstances, and has as its object the provision of a digital camera in which operation situations of a plurality of functions of the camera can be checked from a front of the camera without adding any new hardware.

In order to attain the above-described object, the present invention is directed to a digital camera which has a first function of self-timer image-capturing function and a second function different from the first function, the digital camera comprising: an indicating device which is arranged on a front of the digital camera, indicates a situation in self-timer image-capturing by at least one of lighting and blinking, and indicates an operation situation of the second function. Specifically, the indicating device for self-timer image-capturing which is previously provided on the front of the camera is also used as an indicating device which indicates the operation situation of another function, thereby allowing the operation situation of another function of the camera to be checked from the front of the camera without adding any new hardware.

For example, the second function is at least one of a battery charging function, a moving image-capturing function, and a voice recording function. Specifically, when the digital camera is mounted to a cradle which carries out battery charging or the like, the indicating device allows an operation situation such as charging to be checked from the front of the camera, and in moving image-capturing, moving image-capturing can be notified to a captured person. For a digital camera having a voice recording function of simply recording voice or a voice memo function of recording voice within a certain time after still image-capturing, recordable time can be checked while speaking to a microphone (generally provided on the front of the camera for moving image-capturing).

Preferably, the indicating device indicates the operation situation of the second function by at least one of lighting, blinking, and emitting colors.

The present invention is also directed to a digital camera, wherein: the digital camera has a self-timer image-capturing function; the digital camera is mounted to a cradle; the cradle has a terminal to communicate with an external device carrying out two-way communication, and a power output terminal to output a direct voltage source; the digital camera carries out two-way communication with the external device via the cradle; the digital camera has a charging function of charging a battery in the digital camera by the direct voltage source input from the power output terminal of the cradle when power of the digital camera is off; and the digital camera comprises a first indicating device which is arranged on a front of the digital camera, indicates a situation in self-timer image-capturing by at least one of lighting and blinking, and indicates a charging situation by the charging function.

Preferably, the digital camera further comprises: a second indicating device which is arranged on a rear of the digital camera and indicates the charging situation by the charging function; and a detecting device which detects mounting/non-mounting of the digital camera to the cradle, wherein when the detecting device detects mounting to the cradle, the charging situation of the digital camera is indicated by the first indicating device, and when the detecting device detects non-mounting to the cradle, the charging situation of the digital camera is indicated by the second indicating device on the rear of the camera.

Preferably, data communicating of the digital camera with the external device is indicated by the first indicating device when the power of the digital camera is on. Specifically, the first indicating device allows an operation situation in communicating with the personal computer to be checked from the front of the camera in the state where the digital camera is mounted to the cradle.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a preferred embodiment will be described for a digital camera according to the present invention in accordance with the accompanied drawings.

FIGS. 1 to 5 are respectively a front elevational view, a rear elevational view, a plan view, a bottom view and a right side view of an appearance of a digital camera 10 according to an embodiment of the present invention.

Figure 1:
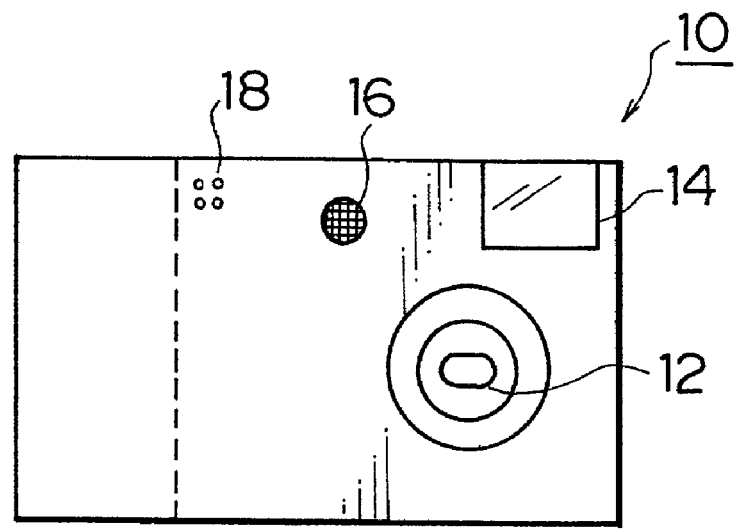
FIG. 1 is a front elevational view of an appearance of a digital camera according to the present invention.

As shown in FIG. 1, a front of the digital camera 10 is provided with a collapsible taking lens 12, a viewfinder window 14, a red self-timer LED 16 and a microphone 18. The front of the digital camera 10 is also provided with a lens cover (not shown) which is opened/closed when the taking lens 12 is in a collapsed position.

Figure 2:
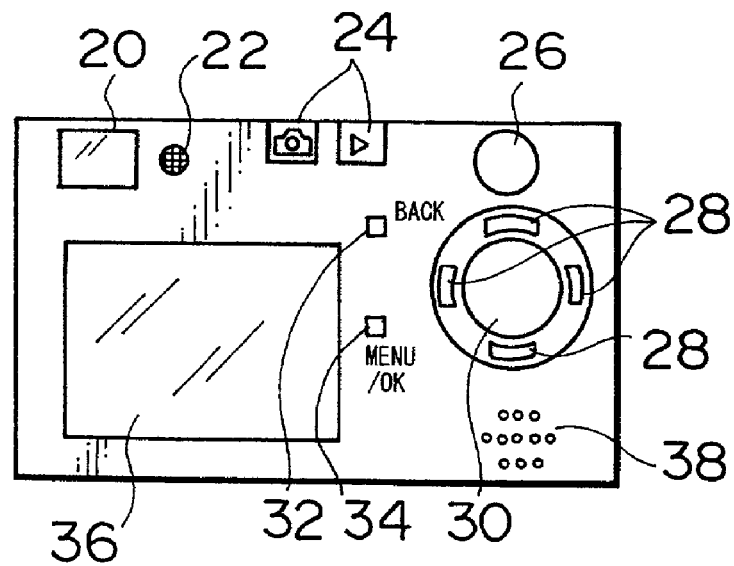
FIG. 2 is a rear elevational of the digital camera shown in FIG. 1.

As shown in FIG. 2, a rear of the digital camera 10 is provided with a viewfinder 20, a finder LED 22, an image-capturing/playback mode selection switch 24, an image-capturing mode selection dial 26, a multifunctional cross key 28, a dot matrix liquid crystal display 30 which displays an operation mode of the camera, a function of the cross key 28, etc. with characters or icons, a back switch 32, a menu/OK switch 34, a liquid crystal monitor 36 for displaying images, a speaker 38, etc.

Figure 3:
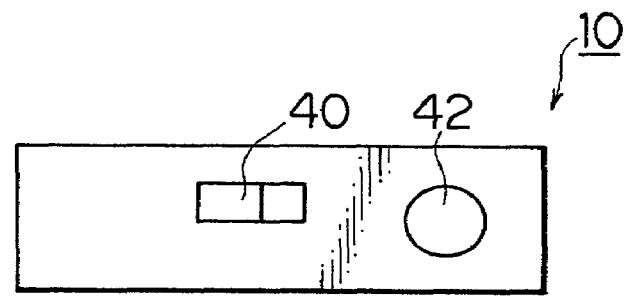
FIG. 3 is a plan view of the digital camera shown in FIG. 1.
Figure 4:
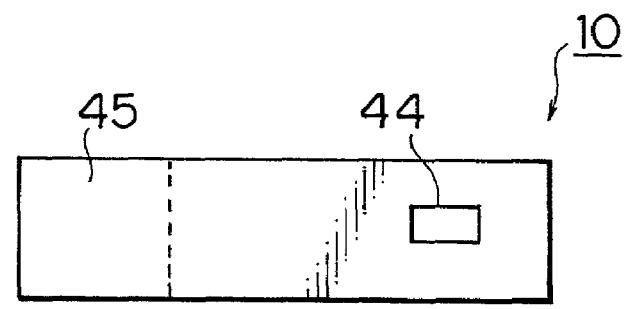
FIG. 4 is a bottom view of the digital camera shown in FIG. 1.

As shown in FIG. 3, a top of the digital camera 10 is provided with a power switch 40 and a shutter button 42, and as shown in FIG. 4, a bottom of the digital camera 10 is provided with a camera connector 44 and a battery cover 45 which opens/closes a battery accommodating portion.

Figure 5:
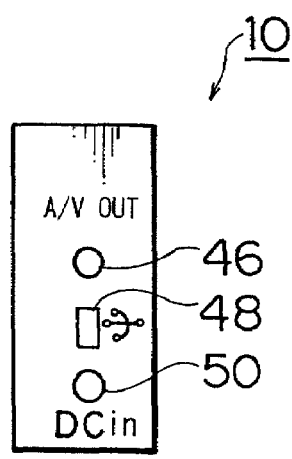
FIG. 5 is a right side view of the digital camera shown in FIG. 1.

As shown in FIG. 5, a side (opposite a grip) of the digital camera 10 is provided with an audio/visual (A/V) output terminal 46, a digital (USB) terminal 48, and a DC input terminal 50.

The digital camera 10 can select an image-capturing mode or a playback mode by the image-capturing/playback mode selection switch 24. In the image-capturing mode, each mode of manual image-capturing, auto image-capturing, moving image, voice recorder, etc. can be selected by the image-capturing mode selection dial 26. The voice recorder mode is a mode of simply recording voice. There is also provided a voice memo function of recording voice after still image-capturing.

The liquid crystal monitor 36 can be used as an electronic viewfinder and can also display a captured image or a playback image read from a memory card mounted to the camera. The liquid crystal monitor 36 also displays information on the number of frames which can be captured, playback frame numbers, presence of electric flash, a macro mode, recording image quality, the number of pixels, etc., and further displays various menus in accordance with operation of the menu/OK switch 34 and cross key 28.

Figure 6:
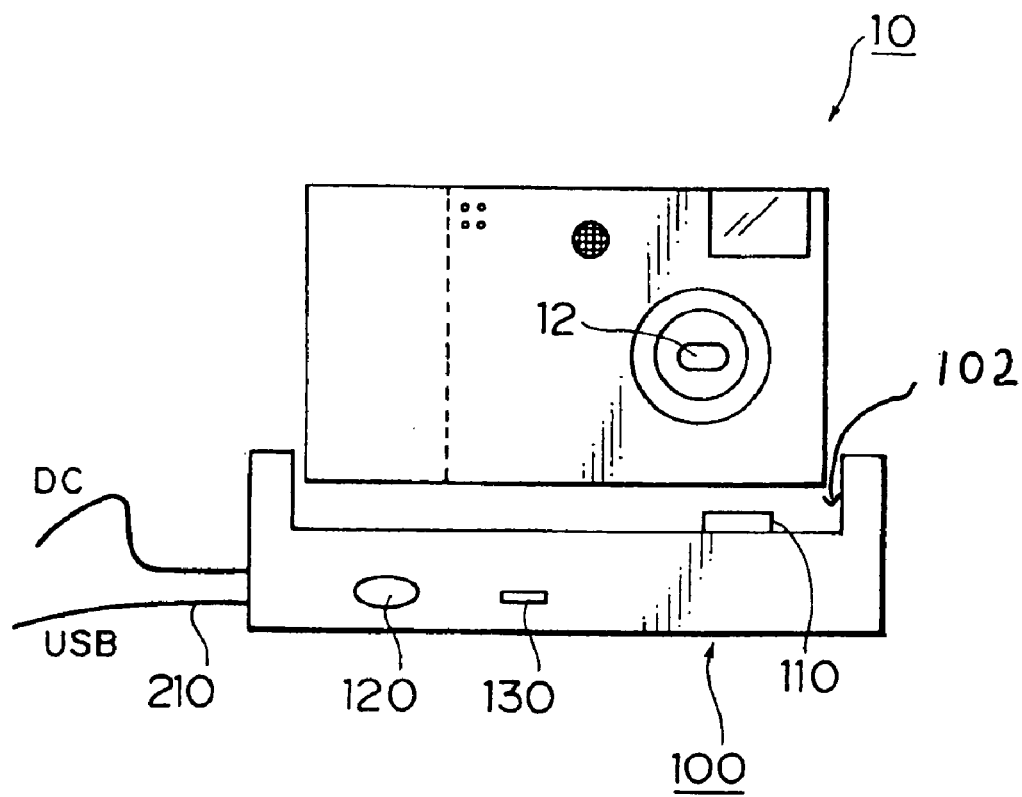
FIG. 6 is a front elevational view of the digital camera and a cradle according to the present invention.

FIG. 6 is a front elevational view of the digital camera 10 and a cradle 100.

As shown in the drawing, the cradle 100 has a recess 102 guiding the digital camera 10 when the camera is mounted/removed, and a bottom of the recess 102 is provided with a cradle connector 110.

A front of the cradle 100 is provided with a power switch 120 and a cradle LED 130, and a rear of the cradle 100 is provided with a USB jack 140 in/out which a USB cable is plugged, and a DC jack 150 in/out which an AC adapter is plugged.

When the digital camera 10 is mounted to the recess 102 of the cradle 100, the camera connector 44 (see FIG. 4) provided on the bottom of the camera is connected to the cradle connector 110 associated with the mounting operation.

Figure 7:
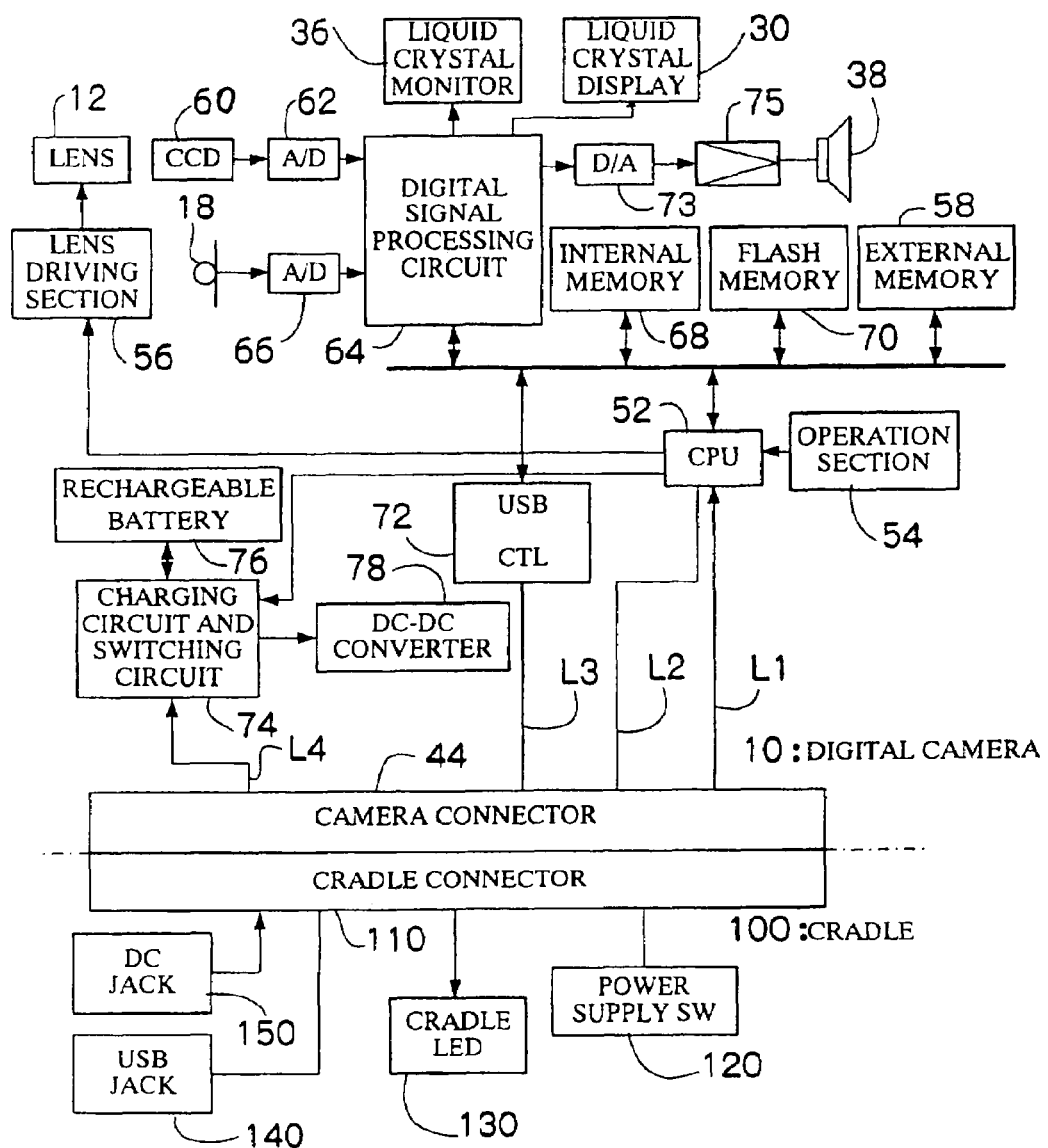
FIG. 7 is a block diagram showing inner structures of the digital camera and the cradle.

FIG. 7 is a block diagram showing inner structures of the digital camera 10 and cradle 100.

In the drawing, a central processing unit (CPU) 52 controls each circuit in the digital camera 10 based on inputs from an operating section 54 including the image-capturing/playback mode selection switch 24, image-capturing mode selection dial 26, cross key 28, back switch 32, menu/OK switch 34, power switch 40, a shutter button 42 having a switch S1 turned on by half press and a switch S2 turned on by full press, etc.

First of all, when the power switch 40 is operated, the CPU 52 detects this to turn on power in the camera. When the image-capturing mode is selected by the image-capturing mode selection dial 26 and the camera is not USB connected to a personal computer or the like, instructions to open the lens cover (not shown) and to project the taking lens 12 in the collapsed position to a capturing position are output to a lens driving section 56 for opening the lens cover and projecting the taking lens 12, thus bringing about an image-capturing standby state.

When the shutter button 42 is pressed in the image-capturing standby state, the CPU 52 detects this to cause still image-capturing or moving image-capturing selected by the image-capturing mode selection dial 26, and cause image data obtained in the image-capturing to be recorded in an external memory 58 such as a memory card. That is, the CPU 52 carries out focus control and iris control via the lens driving section 56, and focuses a subject light on a light receiving surface of a charge coupled device (CCD) 60 via the taking lens 12.

The CCD 60 converts the subject light focused on the light receiving surface to signal charges of the amount corresponding to an amount of the subject light. The signal charges thus accumulated are successively read as voltage signals in accordance with the signal charges. The voltage signals successively read from the CCD 60 are added to an A/D converter 62, and then converted to digital R, G, B signals to be output to a digital signal processing circuit 64.

The digital signal processing circuit 64 carries out predetermined image processing such as synchronization for converting the successive R, G, B signals added from the A/D converter 62 to synchronized signals, white balance adjustment, gamma correction, or YC signal processing, and compresses a brightness signal Y and chroma signals Cr, Cb (YC signals) generated by the YC signal processing to a predetermined format to be then recorded in the external memory 58. In moving image-capturing, voice is detected by the microphone 18, and the detection signal (voice signal) is converted to a digital signal by an AID converter 66 and then added to the digital signal processing circuit 64. The digital signal processing circuit 64 then records voice data in the external memory 58 together with the image data. An internal memory 68 temporality stores R, G, B original data or YC signals before the signal processing, and a flash memory 70 stores a program or a constant for controlling the camera.

The finder LED 22 includes LEDs of two colors (red and green), and the CPU 52 controls the finder LED 22 so as to emit a green light in power on and image-capturing standby, to emit an orange light (simultaneous emitting of red and green lights) in electric flash charging, and to emit a red light in warning of media error or system error. The finder LED 22 can indicate compression recording of the image or USB data communicating by alternately emitting green and orange lights. Further, rechargeable battery charging may be indicated by emitting the orange light.

On the other hand, when the playback mode is selected by the image-capturing mode selection dial 26 and the camera is not USB connected to the personal computer or the like, compressed data of a last image file (a first frame of the moving image) recorded in the external memory 58 is read and expanded to non-compressed YC signals by the digital signal processing circuit 64, and then converted to a color composite video signal to be output to the liquid crystal monitor 36. This causes the liquid crystal monitor 36 to display a frame image of the last file recorded in the external memory 58. When moving image playback is started by operating the operating section 54 with one frame of the moving image displayed, the moving image is played back on the liquid crystal monitor 36, voice data is output to the speaker 38 via a D/A converter 73 and an amplifier 75, and the voice recorded simultaneously with the moving image is played back.

Operation of a right/left key of the cross key 28 permits frame feeding in a forward or reverse direction, an image file in a position of the fed frame is read from the external memory 58, and the still image or moving image is played back on the liquid crystal monitor 36 similarly as described above.

On the other hand, the cradle 100 is provided with the power switch 120, cradle LED 130, USB jack 140 and DC jack 150 as described above, which are electrically connected to the cradle connector 110.

The camera connector 44 of the digital camera 10 is also provided with terminals respectively corresponding to terminals of the cradle connector 110. When the digital camera 10 is mounted to the cradle 100, the respective terminals of the camera connector 44 and the respective terminals of the cradle connector 110 are electrically connected.

Next, operation of the camera with the digital camera 10 mounted to the cradle 100 will be described.

When the digital camera 10 is mounted to the cradle 100 with the power of the digital camera 10 being off and the power switch 120 of the cradle is turned on, the CPU 52 detects this to turn on the power in the camera to boot up in a communication mode (USB mode) and to automatically start communication. The digital camera 10 monitors a bus of a USB terminal reaching a high level to thereby determine USB connection/disconnection to the personal computer. The digital camera 10 behaves as a device having two different kinds of classes in accordance with USB setting states of the camera body when USB connected. Specifically, the USB mode includes a USB mass storage class mode for causing the digital camera 10 to function as a card reader, and a USB camera mode for causing the digital camera 10 to function as a PC camera, and either of the modes is previously set in a setup of the camera. When the USB is set to the card reader, the image data recorded in the external memory 58 is appropriately read and transmitted, and when the USB is set to the PC camera, the moving data currently being captured is continuously transmitted for permitting a videoconference or the like.

The cradle LED 130 is connected to the CPU 52 via the cradle connector 110 and camera connector 44, and indicates various states of the camera in accordance with signals input from the CPU 52. Specifically, the cradle LED 130 is controlled to light/go-out in accordance with power on/off states of the camera. The cradle LED 130 is controlled to blink when the digital camera 10 and the personal computer are in an USB operation state, and to intermittently light in a USB removal OK state.

The USB jack 140 is connected to a USB controller 72 via the cradle connector 110, the camera connector 44 and a line L3. The CPU 52 checks the USB connection when the power of the camera is on as described above, and then automatically sets the operation mode of the camera to the USB mode to start USB communication via a USB controller 72.

The DC jack 150 is connected to a charging circuit and switch circuit 74 via the cradle connector 110 and the camera connector 44. Therefore, when a direct voltage source is supplied from an AC adaptor (not shown) to the DC jack 150, the direct voltage source is supplied to the charging circuit and switch circuit 74. When the direct voltage source is supplied during the power of the camera being off, the charging circuit and switch circuit 74 starts charging operation of the rechargeable battery 76, and stops the charging operation when the rechargeable battery 76 is full.

On the other hand, when the power of the camera is on, the charging circuit and switch circuit 74 carries out no charging operation, and switches the direct voltage source input from the DC input terminal by an instruction from the CPU 52 so as to be supplied to a DC-DC converter 78. The DC-DC converter 78 generates various power supply voltages required by the respective circuit of the camera from the input direct voltage source, and supplies the voltages to the respective circuits in the camera.

It is needless to say that the digital camera 10 operates similarly as described above when the USB cable or AC adapter are respectively plugged in the USB terminal 48 and DC input terminal 50 on a side of the camera shown in FIG. 5.

Next, control of the self-timer LED 16 will be mainly described with reference to flowcharts of FIGS. 8 to 14.

Figure 8:
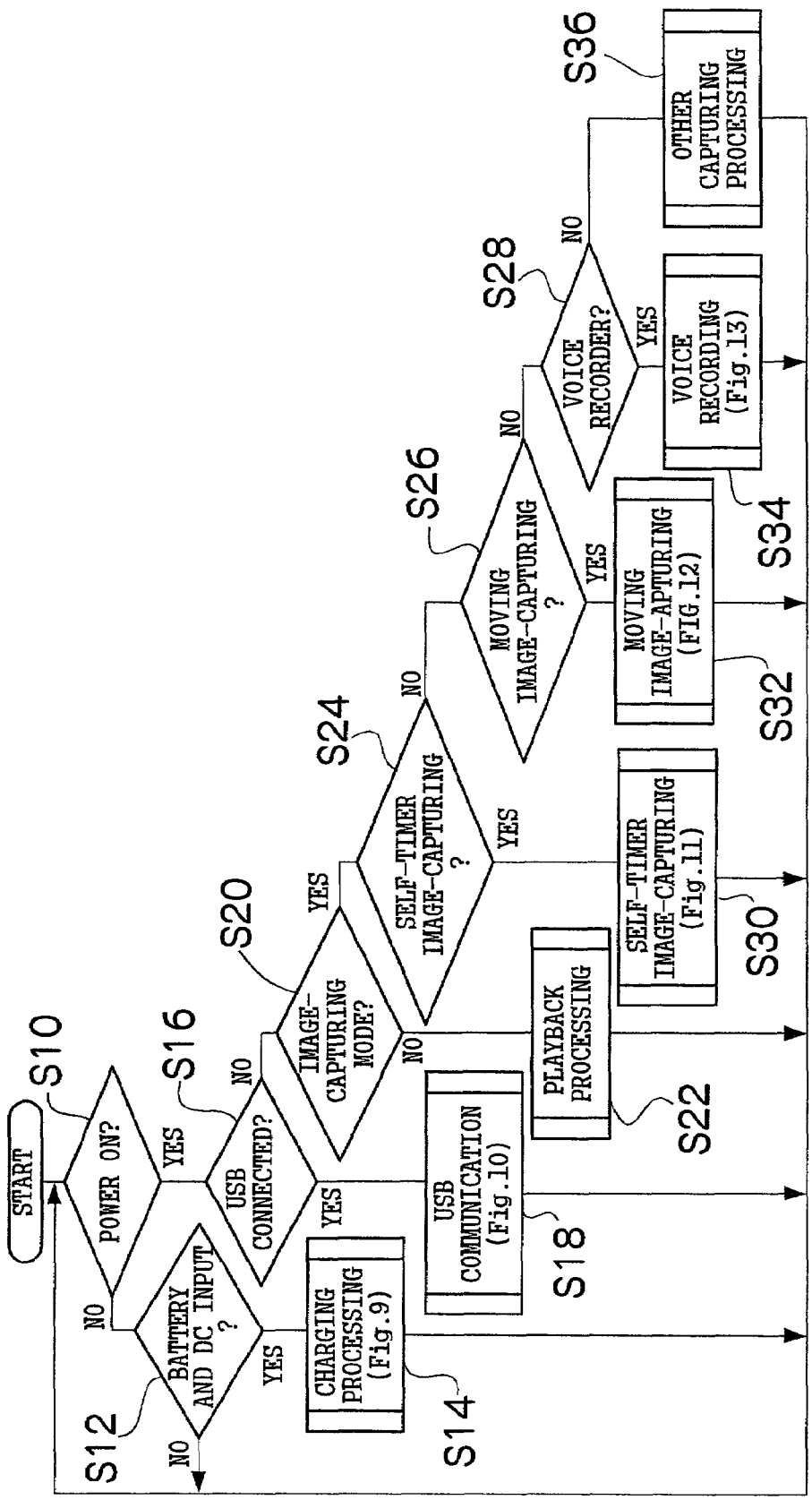
FIG. 8 is a flowchart used for explaining operation of the digital camera according to the present invention.
Figure 9:
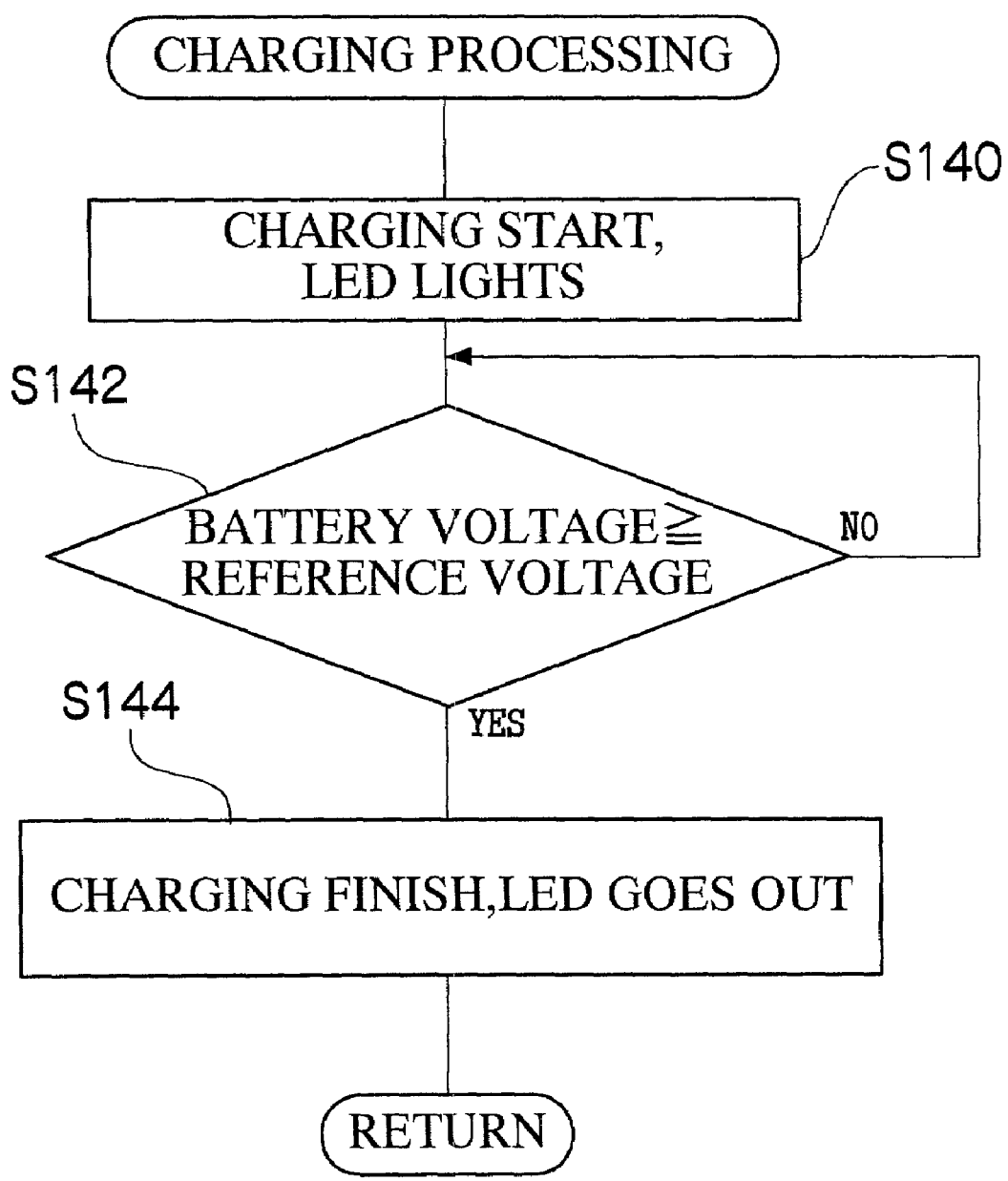
FIG. 9 is a flowchart showing charging processing.

As shown in FIG. 8, the CPU 52 determines whether the power of the camera is on (step S10), and when the power is off, determines whether the rechargeable battery is inserted in the camera and whether the direct voltage source is input in the DC input terminal (step S12). When the battery is inserted in the camera and the direct voltage source is input in the DC input terminal, charging processing as shown in FIG. 9 is carried out (step S14). Details of the charging processing will be described later.

When the rechargeable battery is not inserted in the camera, or when the direct voltage source is not input in the DC input terminal, the charging processing in step 14 is not carried out, and processing returns to step S10.

When determined that the power of the camera is on in step S10, it is then determined whether the camera is USB connected (step S16). When the camera is USB connected, the USB mode has priority and USB communication processing (step S18) is carried out. When the camera is not USB connected, it is determined whether the image-capturing mode is selected by the image-capturing/playback mode selection switch 24 (step S20), and when the image-capturing mode is not selected (that is, when the playback mode is selected), the still image or moving image is played back as described above (step S22).

In the image-capturing mode, on the other hand, it is determined whether the mode set by operating the image-capturing mode selection dial 26, menu/OK switch 34, or the like is a self-timer image-capturing mode, moving image-capturing mode, or voice recorder mode (steps S24 to S28). Then, the processing in accordance with each mode is carried out (steps S30 to S34). When the mode does not fall in any mode in steps S24 to S28, other capturing processing is carried out (step S36).

FIG. 9 is a flowchart showing charging processing in step S14 in FIG. 8.

In the drawing, when charging of the rechargeable battery 76 is started by the charging circuit and switch circuit 74, the self-timer LED 16 is lit (step S140). Then, it is determined whether a battery voltage of the rechargeable battery 76 is greater than or equal to a reference voltage corresponding to a voltage when the rechargeable battery 76 is fully charged (step S142), and when the battery voltage becomes greater than or equal to the reference voltage, charging is finished and the self-timer LED 16 is put out (step S144). Indicating charging of the rechargeable battery 76 by the self-timer LED 16 on the front of the camera in this way allows charging to be easily checked with the digital camera 10 mounted to the cradle 100.

Figure 10:
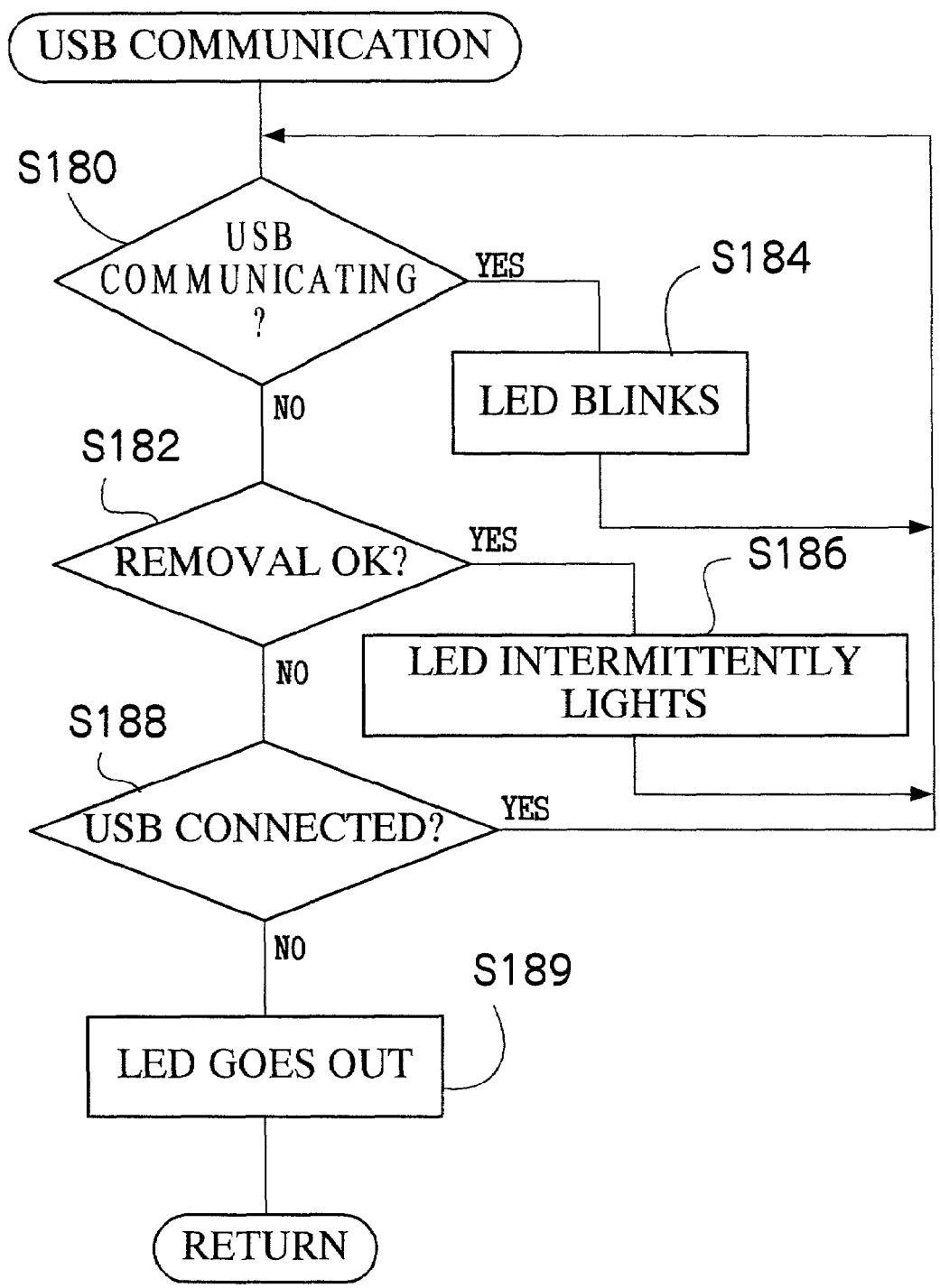
FIG. 10 is a flowchart showing USB communication processing.

FIG. 10 is a flowchart showing USB communication processing in step S18 in FIG. 8.

As shown in FIG. 10, USB communicating or USB removal OK is determined (step S180, S182). In USB communicating, the self-timer LED 16 is made to blink (step S184), and in USB removal OK, the self-timer LED 16 is intermittently lit (step S186). When the USB connection cannot be checked in step S188 as in the case where the power of the personal computer is turned off or where the USB cable is removed, the USB mode is finished and the self-timer LED 16 is put out (step S189). Indicating the USB communication state by the self-timer LED 16 in this way allows the USB communication state to be easily checked with the digital camera 10 mounted to the cradle 100. In this case, the need for the cradle LED 130 of the cradle 100 is eliminated.

Figure 11:
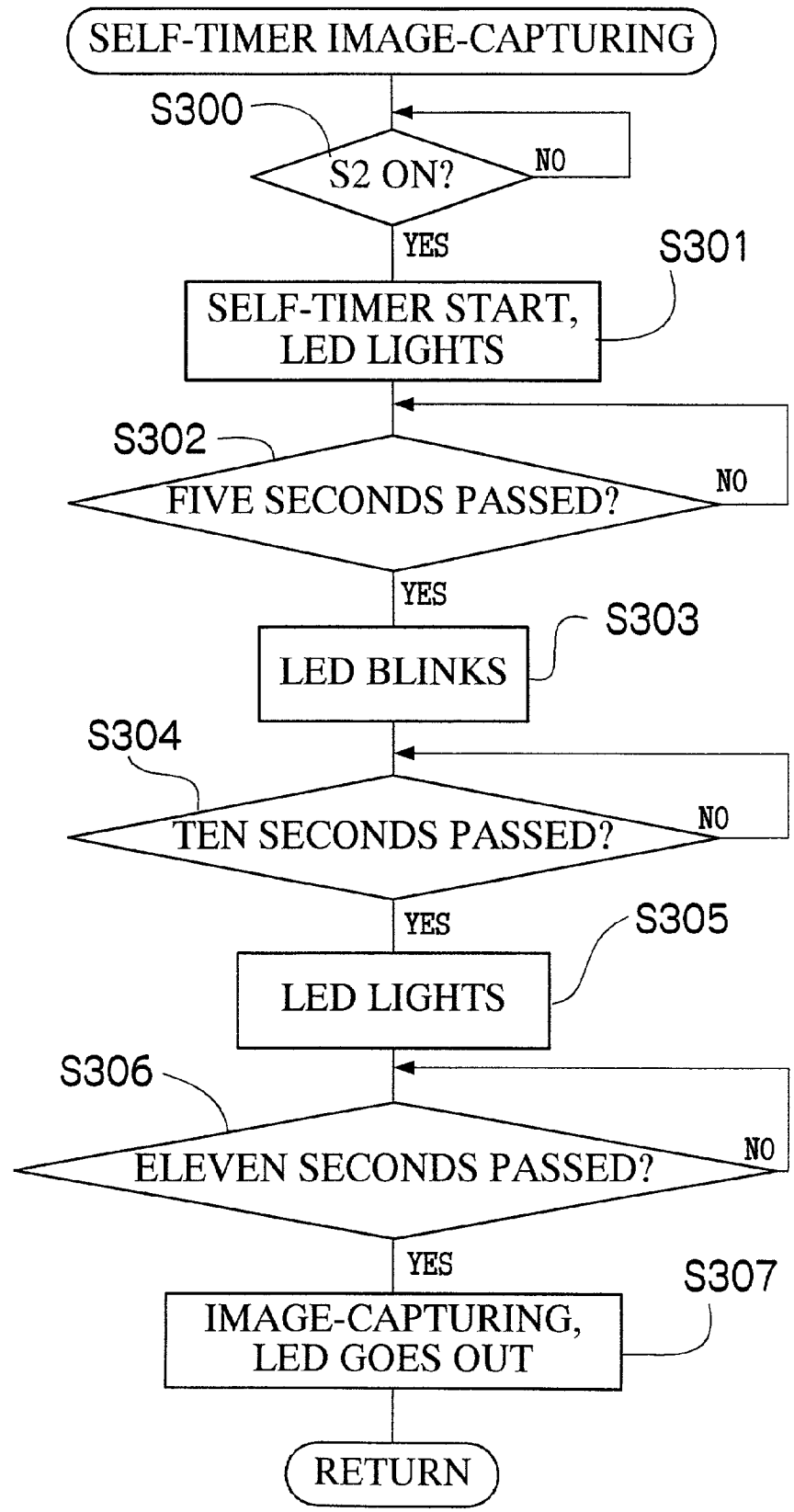
FIG. 11 is a flowchart showing self-timer image-capturing processing.

FIG. 11 is a flowchart showing self-timer image-capturing processing in step S30 in FIG. 8.

As shown in the drawing, it is determined whether the shutter button 42 is fully pressed (whether the switch S2 is turned on) (step S300), and when the switch S2 is turned on, self-timer is started and the self-timer LED 16 is lit (step S301). Five seconds after the start of the self-timer, the self-timer LED 16 is switched to blinking (steps S302, S303), ten seconds thereafter, the self-timer LED 16 is switched to lighting again (steps S304, S305), and eleven seconds thereafter, self-timer image-capturing is carried out and the self-timer LED 16 is put out (steps S306, S307). A captured person can check the situation of self-timer image-capturing by lighting or blinking of the self-timer LED 16.

Figure 12:
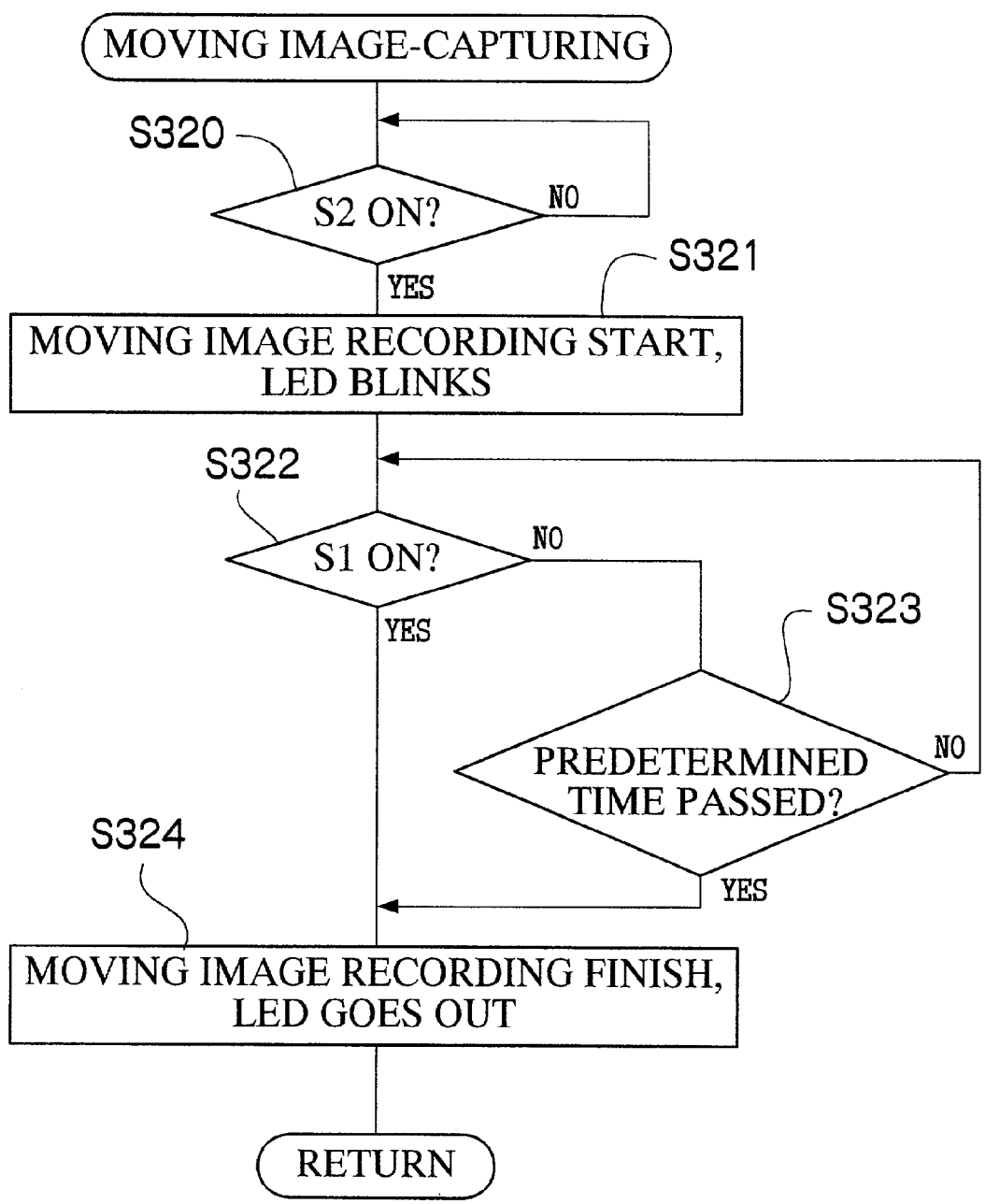
FIG. 12 is a flowchart showing moving image-capturing processing.

FIG. 12 is a flowchart showing a moving image-capturing process in step S32 in FIG. 8.

As shown in the drawing, it is determined whether the switch S2 is turned on (step S320), and when the switch S2 is turned on, recording of the moving image is started and the self-timer LED 16 is made to blink (step S321). Then, it is determined whether the shutter button 42 is half pressed (whether the switch S1 is turned on), or whether a predetermined time in which the moving image can be recorded has passed (steps S322, S323), and when the switch S1 is turned on, or the predetermined time in which the moving image can be recorded has passed, moving image recording is finished and the self-timer LED 16 is put out (step S324). This allows the captured person to check moving image-capturing by blinking of the self-timer LED 16.

Figure 13:
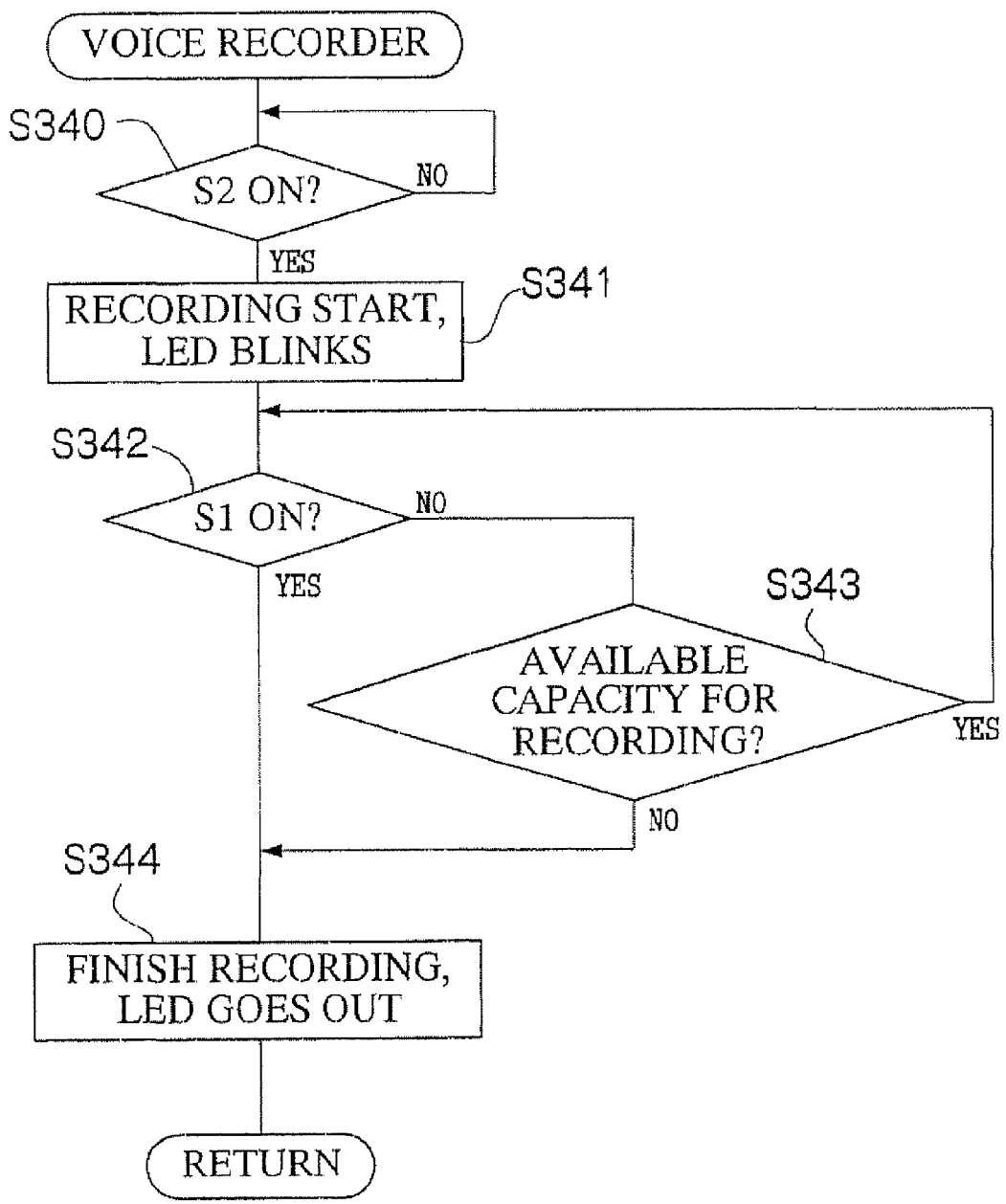
FIG. 13 is a flowchart showing voice recorder processing.

FIG. 13 is a flowchart showing a voice recorder processing in step S34 in FIG. 8.

As shown in the drawing, it is determined whether the switch S2 is turned on (step S340), and when the switch S2 is turned on, voice recording is started and the self-timer LED 16 is made to blink (step S341). Then, it is determined whether the switch S1 is turned on or whether there is no available capacity in a recording medium (steps S342, S343), and when the switch S1 is turned on, or when there is no available capacity, voice recording is finished and the self-timer LED 16 is put out (step S344). This allows the captured person to check recording by blinking of the self-timer LED 16 while speaking to the microphone 18 on the front of the camera.

In step S36 in FIG. 8, capturing operation other than those described above is carried out, and image-capturing using the voice memo function of the digital camera 10 is also carried out in step S36.

The voice memo function is a function of recording voice for thirty seconds maximum after the still image-capturing, and the voice memo function can be selected in a menu screen in the image-capturing mode of the still image.

Figure 14:
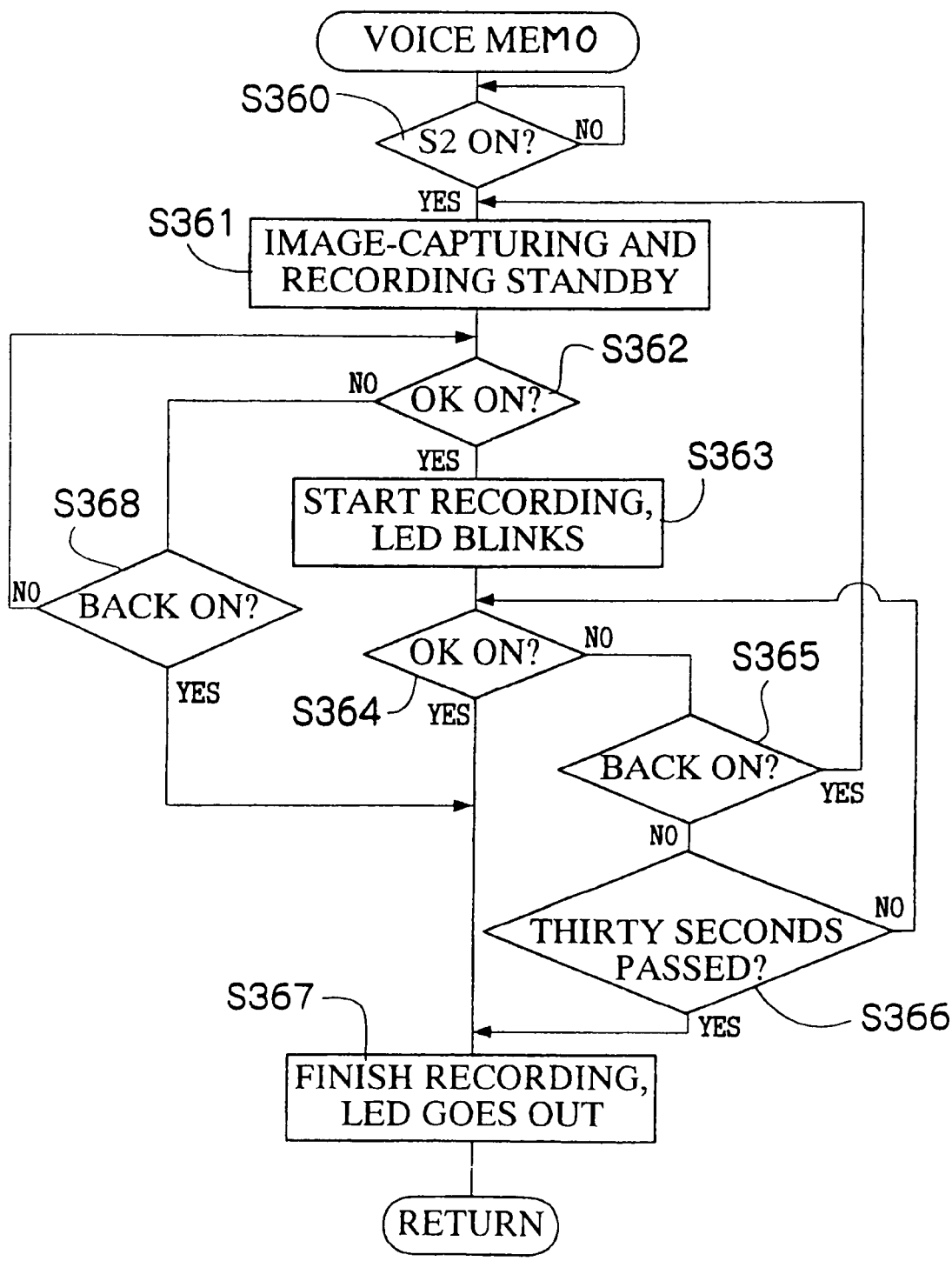
FIG. 14 is a flowchart showing processing when a voice memo function is selected.

FIG. 14 is a flowchart showing processing when the voice memo function is selected.

As shown in the drawing, it is determined whether the switch S2 is turned on (step S360), and when the switch S2 is turned on, the still image is captured and recorded to bring about a recording standby state (step S361), where it is determined whether the menu/OK switch 34 is turned on (step S362). When it is determined that the menu/OK switch 34 is turned on in step S362, voice recording is started and the self-timer LED 16 is made to blink (step S363). Then, it is determined whether the menu/OK switch 34 is again turned on (step S364), and when the menu/OK switch 34 is turned on, voice recording is finished and the self-timer LED 16 is put out (step S367).

When the menu/OK switch 34 is not turned on in step S364 and the back switch 32 is turned on in step S365, processing returns to step S361. This permits rerecording.

When thirty seconds has passed without the menu/OK switch 34 and back switch 32 turned on (step S366), processing continues to step S367. When the menu/OK switch 34 is not turned on in step S362 and the back switch 32 is turned on in step S368, processing also continues to step S367. In this case, voice information is not recorded.

In this embodiment, the operation situations of the battery charging function, moving image-capturing function, and voice recording function different from the self-timer image-capturing function are indicated by the self-timer LED, but functions whose operation situations are indicated by the self-timer LED are not limited to these. For example, capturing operation of the still image may be indicated. The operation situations are indicated by lighting, blinking, going out of the red self-timer LED, but not limited to this, LEDs of two colors (red, green) may be used like a finder LED to indicate the operation situations by emitting colors of red, green and orange (simultaneous emitting of red and green), and further, the operation situation or the kind of the function to be indicated may be indicated by combination of lighting, blinking and emitting colors. The indicating device which indicates the operation situations is not limited to the LED, but other light emitting device may be used.

Further, a detecting device which detects mounting/non-mounting of the camera to the cradle may be provided on the digital camera in such a manner that when the detecting device detects mounting to the cradle, the operation situation of the camera is indicated by the self-timer LED on the front of the camera, and when the detecting device detects non-mounting to the cradle, the operation situation of the camera is indicated by another indicating device (for example, the finder LED) on the rear of the camera.

As described above, according to the present invention, the indicating device which is previously provided on the front of the camera and indicates the situation in self-timer image-capturing by lighting or blinking is also used as the indicating device which indicates the operation situations of other functions of the camera, thereby allowing the operation situations of other functions of the camera to be easily checked from the front of the camera without adding new hardware. For example, when the digital camera is mounted to the cradle used in charging the battery or communicating with the personal computer, the indicating device allows the operation situation such as charging or communicating to be checked from the front of the camera with the digital camera mounted to the cradle, and in moving image-capturing, moving image-capturing can be notified to the captured person. For the digital camera having the voice recording function of simply recording voice or the voice memo function of recording voice within a certain time after still image-capturing, recordable time can be checked while speaking to the microphone (generally provided on the front of the camera for moving image-capturing).

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera, wherein:
    the digital camera has a self-timer image-capturing function;
    the digital camera is mounted to a cradle;
    the cradle has a terminal to communicate with an external device carrying out two-way communication, and a power output terminal to output a direct voltage source;
    the digital camera carries out two-way communication with the external device via the cradle;
    the digital camera has a charging function of charging a battery in the digital camera by the direct voltage source input from the power output terminal of the cradle when power of the digital camera is off; and
    the digital camera comprises a first indicating device which is arranged on a front of the digital camera,
    wherein the first indicating device indicates a situation in self-timer image-capturing by at least one of lighting and blinking, and indicates a charging situation by the charging function,
    wherein the first indicating device indicates the two-way communication with the external device when the two-way communication is performed,
    wherein the first indicating device indicates the self-timer image-capturing function when the two-way communication is not performed and the self-timer image-capturing is performed,
    wherein the digital camera further comprises
        a second indicating device which is arranged on a rear of the digital camera and indicates the charging situation by the charging function; and
        a detecting device which detects mounting/non-mounting of the digital camera to the cradle,
    wherein when the detecting device detects mounting to the cradle, the charging situation of the digital camera is indicated by the first indicating device, and when the detecting device detects non-mounting to the cradle, the charging situation of the digital camera is indicated by the second indicating device on the rear of the camera.

2. The digital camera according to claim 1, further comprising a CPU, wherein the CPU is configured to
    determine whether the power of the digital camera is on or off,
    determine whether the battery is in the digital camera when it is determined that the power of the digital camera is off,
    perform the charging function when it is determined that the battery is in the digital camera and the power of the digital camera is off, wherein the first indicating device indicates that the charging function is being performed,
    determine whether the cradle is in communication connection with the external device when it is determined that the power of the digital camera is on, and
    perform the external device communication function with the external device when it is determined that the power of the digital camera is on and the cradle is in communication connection with the external device, wherein the indicating device indicates that the external device communication function is being performed.

3. A digital camera which has a first function of self-timer image-capturing function and a second function different from the first function, the digital camera comprising:
    an indicating device which is arranged on a front of the digital camera, wherein the indicating device indicates a situation in self-timer image-capturing by at least one of lighting and blinking, and indicates an operation situation of the second function; and
    a CPU,
    wherein the second function is at least one of an external device communication function, a battery charging function or a moving image-capturing function,
    wherein the indicating device indicates the external device communication function when a communication with an external device is performed,
    wherein the indicating device indicates the moving-image capturing function when the communication with the external device is not performed and the moving-image capturing is performed, and
    wherein the CPU is configured to
        determine whether a power of the digital camera is turned on or off,
        determine whether a battery is inserted into the digital camera when it is determined that the power of the digital camera is turned off,
        perform the battery charge function when it is determined that the battery is inserted into the digital camera and the power of the digital camera is turned off, wherein the indicating device indicates that the battery charge function is being performed,
        determine whether the digital camera is in communication connection with an external device when it is determined that the power of the digital camera is turned on,
        perform the external device communication function with the external device when it is determined that the power of the digital camera is turned on and the digital camera is in communication connection with the external device, wherein the indicating device indicates that the external device communication function is being performed,
        determine whether the digital camera is in image capturing mode when it is determined that the power of the digital camera is turned on and the digital camera is not in communication connection with the external device, perform a playback processing function when it is determined that the power of the digital camera is turned on, the digital camera is not in communication connection with the external device and the digital camera is not in image capturing mode, determine whether the digital camera is in a self-timer image-capturing mode, a moving image-capturing mode or a voice recording mode when it is determined that the power of the digital camera is turned on, the digital camera is not in communication connection with the external device and the digital camera is in image capturing mode, perform the self-timer image-capturing function when it is determined that the power of the digital camera is turned on, the digital camera is not in communication connection with the external device and the digital camera is in the self-timer image-capturing mode, wherein the indicating device indicates that the self-timer image-capturing function is being performed, perform the moving image-capturing function when it is determined that the power of the digital camera is turned on, the digital camera is not in communication connection with the external device and the digital camera is in the moving image-capturing mode, wherein the indicating device indicates that the moving image-capturing function is being performed, and perform a voice recording function when it is determined that the power of the digital camera is turned on, the digital camera is not in communication connection with the external device and the digital camera is in the voice recording mode, wherein the indicating device indicates that the voice recording function is being performed.

4. A method for indicating a plurality of functions of a camera, comprising:

indicating a first function utilizing an indicating device located in a front of the camera, wherein the first function is a self-timer image-capturing function; and indicating a second function utilizing the indicating device, wherein the second function includes a battery charge processing or a moving image-capturing, determining whether a power of the camera is turned on or off;

determining whether a battery is inserted into the camera when it is determined that the power of the camera is turned off;

performing the battery charge function and indicating, utilizing the indicating device, that the battery charge function is being performed when it is determined that the battery is inserted into the camera and the power of the camera is turned off;

determining whether the camera is in communication connection with an external device when it is determined that the power of the camera is turned on;

performing the external device communication function with the external device and indicating, utilizing the indicating device, that the external device communication function is being performed when it is determined that the power of the camera is turned on and the camera is in communication connection with the external device;

determining whether the camera is in image capturing mode when it is determined that the power of the camera is turned on and the camera is not in communication connection with the external device;

performing a playback processing function when it is determined that the power of the camera is turned on, the camera is not in communication connection with the external device and the camera is not in image capturing mode;

determining whether the camera is in a self-timer image-capturing mode, a moving image-capturing mode or a voice recording mode when it is determined that the power of the camera is turned on, the camera is not in communication connection with the external device and the camera is in image capturing mode;

performing the self-timer image-capturing function and indicating, utilizing the indicating device, that the self-timer image-capturing function is being performed when it is determined that the power of the camera is turned on, the camera is not in communication connection with the external device and the camera is in the self-timer image-capturing mode;

performing the moving image-capturing function and indicating, utilizing the indicating device, that the moving image-capturing function is being performed when it is determined that the power of the camera is turned on, the camera is not in communication connection with the external device and the camera is in the moving image-capturing mode; and performing a voice recording function indicating, utilizing the indicating device, that the voice recording function is being performed when it is determined that the power of the camera is turned on, the camera is not in communication connection with the external device and the camera is in the voice recording mode, wherein the second function further includes at least one of communications processing, audio recording, and voice memo processing, wherein the step of indicating the communications processing is performed when the camera is performing the communications processing with an external device, and wherein the step of indicating the self-timer image capturing function is performed when the camera is not performing the communications processing with the external device and is performing the self-timer image capturing function.

5. A digital camera, comprising:

an indicating device arranged on a front of the digital camera; and a CPU, wherein the digital camera is capable of performing a self-timer image-capturing, a battery charging, and a moving-image capturing, and wherein the indicating device is configured to indicate the self-timer image-capturing is taking place when the camera performs the self-timer image-capturing, indicate the battery charging is taking place when the camera performs the battery charging, and indicate the moving image-capturing is taking place when the camera performs the moving image-capturing, wherein the CPU is configured to determine whether a power of the digital camera is turned on or off, determine whether a battery is inserted into the digital camera when it is determined that the power of the digital camera is turned off, perform the battery charging when it is determined that the battery is inserted into the digital camera and the power of the digital camera is turned off, determine whether the digital camera is in communication connection with an external device when it is determined that the power of the digital camera is turned on, perform the external device communication function with the external device when it is determined that the power of the digital camera is turned on and the digital camera is in communication connection with the external device, wherein the indicating device indicates that the external device communication function is being performed, determine whether the digital camera is in image capturing mode when it is determined that the power of the digital camera is turned on and the digital camera is not in communication connection with the external device, perform a playback processing when it is determined that the power of the digital camera is turned on, the digital camera is not in communication connection with the external device and the digital camera is not in image capturing mode, determine whether the digital camera is in a self-timer image-capturing mode, a moving image-capturing mode or a voice recording mode when it is determined that the power of the digital camera is turned on, the digital camera is not in communication connection with the external device and the digital camera is in image capturing mode, perform the self-timer image-capturing when it is determined that the power of the digital camera is turned on, the digital camera is not in communication connection with the external device and the digital camera is in the self-timer image-capturing mode, perform the moving image-capturing when it is determined that the power of the digital camera is turned on, the digital camera is not in communication connection with the external device and the digital camera is in the moving image-capturing mode, and perform a voice recording when it is determined that the power of the digital camera is turned on, the digital camera is not in communication connection with the external device and the digital camera is in the voice recording mode, wherein the indicating device indicates that the voice recording is being performed.

* * * * *